United States Patent [19]

Ueda et al.

[11] Patent Number: 4,944,715
[45] Date of Patent: Jul. 31, 1990

[54] CHAIN FOR V-PULLEY

[75] Inventors: Seitaro Ueda, Kumagaya; Yukio Okubo, Fukaya; Shinichiro Izumi, Kumagaya; Takeshi Hoshiro, Takarazuka, all of Japan

[73] Assignees: Hitachi Metals, Ltd., Tokyo; Mitsuboshi Belting Ltd., Hyogo, both of Japan

[21] Appl. No.: 370,000

[22] Filed: Jun. 22, 1989

[30] Foreign Application Priority Data

Jun. 27, 1988 [JP] Japan .................. 63-158254

[51] Int. Cl.$^5$ .............................................. F16G 1/22
[52] U.S. Cl. .................................................. 474/245
[58] Field of Search ............... 474/237, 240, 242, 244, 474/245, 201

[56] References Cited

U.S. PATENT DOCUMENTS

| | | | |
|---|---|---|---|
| 2,550,431 | 4/1951 | Shaw | 474/242 |
| 2,690,678 | 10/1954 | Bendall | 474/245 |
| 4,349,343 | 9/1982 | Stephanoff et al. | 474/245 |
| 4,430,067 | 2/1984 | Whitaker | 474/244 |
| 4,608,036 | 8/1986 | Dono | 474/245 X |
| 4,618,338 | 10/1986 | Rattunde et al. | 474/245 |
| 4,798,567 | 1/1989 | Hoshiro | 474/242 |

FOREIGN PATENT DOCUMENTS

| | | |
|---|---|---|
| 0127255 | 12/1984 | European Pat. Off. |
| 0127266 | 12/1984 | European Pat. Off. |
| 2089587 | 12/1971 | France |
| 2580052 | 10/1986 | France |
| 209145 | 12/1923 | United Kingdom |
| 2066410 | 7/1989 | United Kingdom |

OTHER PUBLICATIONS

Patent Abstracts of Japan, vol. 9, No. 149, Jun. 25, 1985, p. 136M390 (JP-A-26831).
Patent Abstracts of Japan, vol. 9, No. 307, Dec. 4, 1985, p. 78M435 (JP-A-143243).
Patent Abstracts of Japan, vol. 13, No. 210, Jan. 11, 1989, p. 67M782 (JP-A-63-219937).

*Primary Examiner*—Thuy M. Bui
*Attorney, Agent, or Firm*—Finnegan, Henderson, Farabow, Garrett & Dunner

[57] ABSTRACT

A chain for a V-pulley which is used by being endlessly trained between a pair of V-pulleys and in which blocks each having an end surface for coming into contact with the V-pulley are respectively disposed on the outer sides of outer link plates. The end surface of the block is formed into a convex surface constituted by the whole or part of a conical surface which has substantially the same apex angle as that of the inner wall of the V-pulley and has an axis parallel to the axis of a connecting pin. The block may be fixed with respect to the outer link plate or may be made rotatable about the axis of the cone.

7 Claims, 5 Drawing Sheets

CHAIN FOR V-PULLEY

BACKGROUND OF THE INVENTION:

1. Field of the Invention:

The present invention relates to a chain which is wound around a V-pulley and is suitably used for a continuously variable transmission of an automobile or other transmissions in general.

2. Related Art:

In recent years, a continuously variable transmission system comprising a pair of V-pulleys and an endless belt or chain has come to be used for a continuously variable transmission which is coupled with an engine of such as an automobile having a relatively large torque. Specifically, this continuously variable transmission system is arranged as follows. A pair of V-pulleys in which an interval between their inner walls can be varied are mounted on a drive shaft and a driven shaft, respectively, an endless belt or chain is trained between the two V-pulleys, and the interval between the inner walls of each V-pulley is varied by, for instance, hydraulic means in response to speed change commands. This causes the winding radius of the endless belt or chain trained between the V-pulleys to be varied relatively and continuously, thereby effecting a continuously variable transmission between the drive shaft and the driven shaft.

An endless belt described above is disclosed in Japanese Pat. Publication No. 6783/1980. This is a metal V-belt which is arranged such that metal blocks with a thickness of about 2 mm each having a surface of contact with an inner wall of a V-pulley are fitted with practically no gap with a hoop formed by superposing a plurality of thin metal sheets with no gap therebetween. The transmission of a driving force in this V-belt is effected as follows: The torque of the drive shaft-side V-pulley is transmitted to the blocks via a frictional force, and the driving force between the blocks is transmitted to the preceding blocks through a pushing force. Meanwhile, the driving force at the driven shaft-side V-pulley is converted again to torque through a frictional force. That is, the driving force does not substantially act on the hoop, and the hoop serves as a binding member for preventing the blocks from becoming separated. Accordingly, with this V-belt, no fracture of the hoop takes place, and it has been considered that it excels in terms of durability and noise. However, since the driving force is transmitted by the pushing force exerted among the blocks, the V-belt on the driven shaft-side V-pulley acts to escape in the direction of the outer periphery of the V-pulley. Consequently, there has been a drawback in that the friction between the V-belt and the V-pulley is made disadvantageously small, thereby causing a decline in the driving force-transmitting capabilities. In addition, it has been very difficult to fabricate a hoop formed by superposing a plurality of thin metal sheets without leaving any gap therebetween, and much manpower and time have been required in the fabrication thereof.

Accordingly, a chain for a V-pulley has been proposed in which blocks coming into contact with the V-pulley are fixedly secured to an ordinary chain. According to this chain for a V-pulley, since the driving force is transmitted through a pulling force of the chain, it is possible to overcome the problem of a decline in the driving force transmitting capabilities, which is the drawback of the above-described V-belt. Such chains for V-pulleys are disclosed in, for instance, Japanese Pat. Laid-Open Nos. 226729/1984, 226730/1984, 26831/1985, and 143243/1985. However, these prior arts are generally concerned with techniques for attaching blocks to the chain, or forming the blocks on the link plates or on the opposite ends of the connecting pins. Thus, the end faces of the blocks which are brought into contact with the inner wall of V-pulley have generally been formed into flat surfaces with no particular concern being paid to the configuration of the end faces of the blocks.

As an example in which the configuration of the end face of the block is made not flat, it is possible to cite a technique disclosed in, for instance, Japanese Utility Model Laid-Open No. 196850/1988. In this technique, a cylindrical body having an axis in the longitudinal direction of a chain abuts at a peripheral surface thereof against an inner wall of a V-pulley. However, the inner wall of the V-pulley is conically shaped, and, with this technique, the blocks and the V-pulley can theoretically be only brought into point contact with each other, so that it is considered that it is disadvantageous in terms of the driving force-transmitting capabilities.

In this respect, if the end face of the block is formed with a flat surface having the same inclination as that of the inner wall of the V-pulley (i.e., half the apex angle), it is possible for the end face of the block and the inner wall of the V-pulley to be theoretically brought into contact with each other at a linear line of contact, and this arrangement is advantageous in the transmission of the driving force. However, when the block starts to be engaged with the V-pulley, the block is brought into contact with the V-pulley at a front edge thereof, and when it begins to be disengaged with the V-pulley, the block is brought into contact with the V-pulley at a rear edge thereof. In other words, at the beginning of engagement and disengagement, the block and the V-pulley are not brought into smooth linear contact with each other and the block comes into contact with the V-pulley at its edge, thereby causing a decline in the driving force-transmitting capabilities. In addition, during a period from the time when the block enters the V-pulley and is engaged therewith and until the block is disengaged therefrom, the block rotates back and forth about an axis parallel to the axis of the connecting pin. Since this rotation of the block is effected under high pressure, rotational friction occurs between the block and the V-pulley, causing abrasion of both the block and the V-pulley and a loss in the driving force- In addition, since the portion of the end face of the block which becomes worn is fixed, it is impossible to obtain a chain for a V-pulley having an extended life. Furthermore, since the chain disposed between the two V-pulleys vibrates in the axial direction of the connecting pin, the block collides against the inner wall of the V-pulley at the time of entering the V-pulley, thereby generating noises due to this collision.

To solve these problems, the present inventors proposed a technique (Japanese Pat. Laid-Open No. 219937/1988) in which the block is connected to the tip of the connecting pin in the form of a universal joint without the block being fixed to the link plate, and the end face of the block is made rotatable and swingable to a certain degree about the axis of the connecting pin while maintaining the same inclination as that of the inner wall of the V-pulley. According to this technique, the block is rotatable, the rotational friction caused by the rotation of the block occurring at the time of entrance into the V-pulley does not occur, and the block is swingable. Therefore, it had been expected that the colliding sound occurring when the block collides against the inner wall of the V-pulley during entrance into the V-pulley would be reduced. However, it was not possible to attain a reduction of the noises to the extent that had been expected. As the reason for this problem, it can be conjectured that since the end face of the block was formed into a flat surface, the block and the V-pulley could not maintain smooth linear contact.

SUMMARY OF THE INVENTION

Accordingly, a primary object of the present invention is to provide a chain for a V-pulley in which an end face of a block can constantly maintain smooth linear contact with an inner wall of the V-pulley and which can reduce the rotational friction between the end face of the block and the inner wall of the V-pulley, thereby suppressing the abrasion of the block and the V-pulley and preventing a decline in the driving force-transmitting capabilities.

A second object of the present invention is to provide a chain for a V-pulley which is capable of reducing the partial abrasion of the end face of the block and of reducing the noises caused by the collision between the block and the V-pulley as the block enters the V-pulley.

Another object of the present invention is to provide a chain for a V-pulley which is capable of reducing general noises caused during the running of the chain.

To these ends, in accordance with one aspect of the present invention, there is provided a chain for a V-pulley which has a plurality of link plates and a plurality of connecting pins connecting adjacent ones of the link plates in such a manner as to be bendable and which is used by being endlessly trained between a pair of V-pulleys, the chain comprising: a plurality of blocks each provided on the outside of each of a plurality of outer link plates opposed to an inner wall of the V-pulley, each of the blocks being fixed with respect to the outer link plate; each of the blocks having a convex surface which is brought into contact with the inner wall of the V-pulley; the convex surface being formed as the whole or part of a conical surface; and the conical surface having an apex angle substantially identical with that of the inner wall of the V-pulley and having an axis parallel to the axis of the connecting pin. According to this arrangement, since the block constantly maintains smooth linear contact with the inner wall of the V-pulley, and the rotational friction between the end face of the block and the inner wall of the V-pulley can be reduced, the abrasion between the block and the V-pulley can be suppressed, thereby preventing a decline in the driving force-transmitting capabilities.

In accordance with another aspect of the present invention, there is provided a chain for a V-pulley in which the convex surface is formed into the configuration of a cone or a truncated cone, and the block is rotatable about the axis of the cone or the truncated cone. In accordance with this arrangement, the rotational friction between the block and the V-pulley is substantially reduced to nil. As a result, the abrasion between the two members can be suppressed, the partial abrasion of the end face of the blocks can be reduced, and the noises generated due to the collision between the block and the V-pulley can also be reduced.

In accordance with still another aspect of the present invention, there is provided a chain for a V-pulley in which a time interval from the time when the block is brought into contact with the V-pulley and until an ensuing block is brought into contact with the V-pulley or a radius on the V-pulley where said block is brought into contact therewith during constant-velocity running is substantially non-uniform. In accordance with this arrangement, it is possible to reduce general noises occurring due to the running of the chain.

DESCRIPTION OF THE PREFERRED EMBODIMENTS

Referring now to the accompanying drawings, a description will be given of the preferred embodiments of the present invention. A first embodiment of the present invention shown in FIGS. 1 and 2 comprises a plurality of link plates 10, a plurality of connecting pins 20, and a plurality of blocks 30. The link plates 10 are arranged such that transverse rows each having four link plates and transverse rows each having three link plates are disposed in such a manner as to be alternately offset from each other, the former being hereinafter referred to as main link plates 11 and the latter as subsidiary link plates 13 for the sake of explanation. The connecting pin 20 penetrates a hole 15 formed in each of the main link plates 11 and subsidiary link plates 13, and the connecting pin 20 is fixedly secured only to an outermost link plate 12 among the main link plates 11 and is rotatable with respect to the other link plates. The main link plates 11 and the subsidiary link plates 13 are thus connected to each other in such a manner as to be bendable, thereby forming a chain. This structure is that of quite a common chain, and the present invention does not possess a characteristic feature in the structure of a chain per se. Accordingly, the present invention is applicable to other types of chain, such as the offset type or the bushed type.

Figure 1:
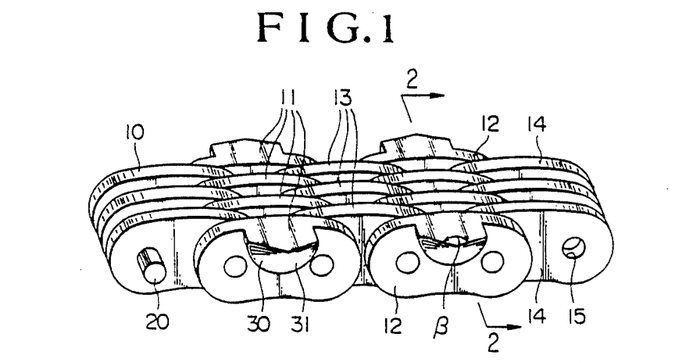
FIG. 1 is a perspective view of an embodiment of the present invention.
Figure 2:
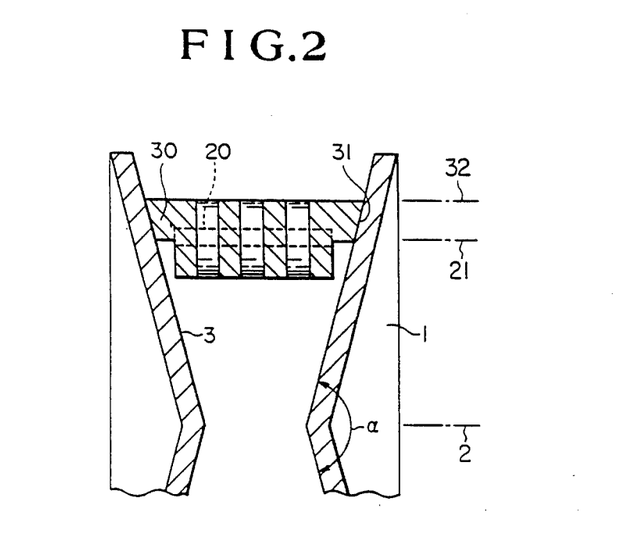
FIG. 2 is a cross-sectional view taken along the line 2—2 of FIG. 1.

A block 30 is provided on the outside of an outer link plate opposed to an inner wall 3 of the V-pulley 1 in such a manner as to be fixed with respect to the outer link plate. In this embodiment, the outer link plate opposed to the inner wall of the V-pulley refers to the outermost link plate 12 among the main link plates 11, and an outermost link plate 14 among the subsidiary link plates 13 is not opposed to the inner wall of the V-pulley. However, if the link pitch is formed longer, the outermost link plate 14 among the subsidiary link plates 13 can also be used as the outer link plate opposed to the inner wall of the V-pulley. In that case, a block may be provided on the outside of the outermost link plate 14 among the subsidiary link plates 13 in such a manner as to be fixed with respect to the outermost link plate 14. In this embodiment, the block 30 is fixed with respect to the outermost link plate 12 among the main link plates 11, and, as for the fixing means, the block 30 may be fixedly secured to or formed integrally with the outermost link plate 12. In addition, although, in this embodiment, one block 30 is provided substantially in the center of the outermost link plate 12 among the main link plates 11, the block 30 may be provided in such a manner as to be offset from the center. Alternatively, a plurality of blocks 30 may be provided on the outermost link plate 12 as a row arranged in the longitudinal direction thereof. In that case, block 30 may be secured to the connecting pin 20 by being force fit therewith.

The block 30 has a convex surface 31 which abuts against the inner wall 3 of the V-pulley 1. The convex surface 31 is formed into a configuration obtained by cutting a conical surface. This cone has an apex angle $\beta$ which is substantially identical with an apex angle $\alpha$ of the inner wall 3 of the V-pulley, and is provided with an axis 32 which is parallel with an axis 21 of the connecting pin 20 and is hence parallel with an axis 2 of the V pulley 1. Although, in FIGS. 1 and 2, a case is shown in which the axis 32 of the cone is disposed at the upper surface of the link plate to facilitate an understanding of the fact that the convex surface 31 is a curved surface obtained by cutting a cone, the position of the axis 32 is not particularly restricted to this arrangement.

Figure 3A:
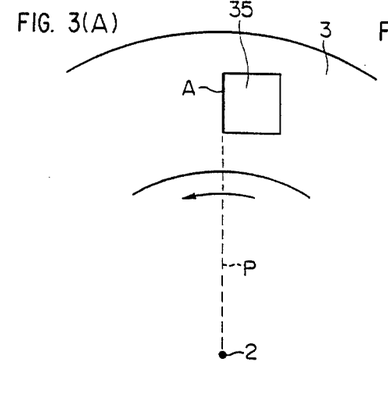
FIGS. 3A to 3D are diagrams illustrating different postures of a block with respect to a V-pulley when the end face of the block is formed into a flat surface.
Figure 3B:
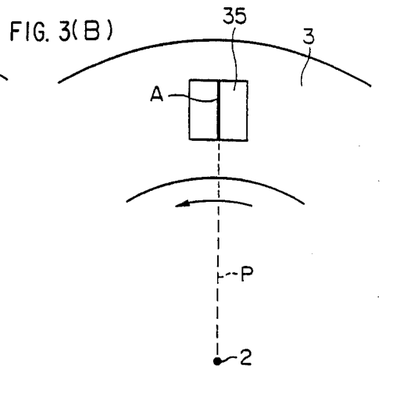
Figure 3C:
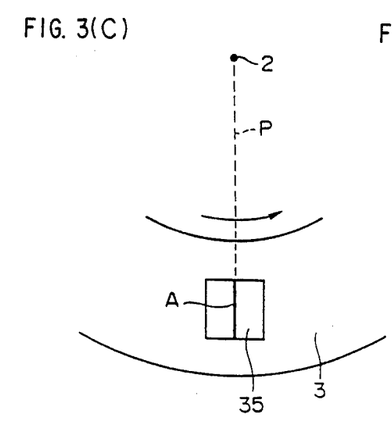
Figure 3D:
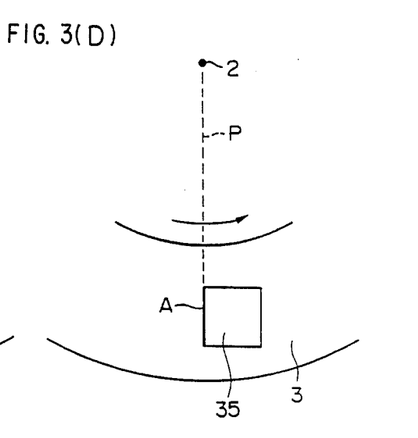
Figure 4:
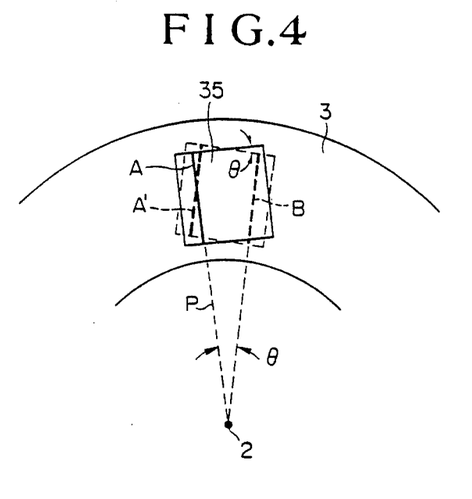
FIG. 4 is a diagram illustrating lines of contact between the end face of the block and the inner wall of the V-pulley when the end face of the block is formed into a flat surface.

A description will now be given of the operation of the chain for a V-pulley thus constructed. FIGS. 3A to 3D are diagrams schematically illustrating different postures of the block in a case where an end face 35 of the block is formed with a flat surface having an inclination identical with that (half the apex angle $\alpha$) of the inner wall 3 of the V-pulley 1. Specifically, FIG. 3A illustrates the posture of the block at the time when the block begins to be engaged with the V-pulley; FIG. 3B, the posture immediately after engagement; FIG. 3C, the posture immediately before disengagement; FIG. 3D, the posture immediately after disengagement. In the drawings, the configuration of the end face 35 is formed to be rectangular so as to facilitate an understanding. If the end face 35 is formed into a flat surface, the block and the V-pulley are brought into contact with each other at a straight line A located within a plane P which passes through the axis 2 of the V-pulley 1 and is perpendicular to the end face 35. Accordingly, when the block starts to be engaged with the V-pulley, the block abuts against the V-pulley at a front edge thereof, as shown in FIG. 3A. When the block is about to be disengaged therefrom, the block is in contact with the V-pulley at a rear edge thereof, as shown in FIG. 3D. The line of contact A thus moves. The contact between the end face 35 of the block and the inner wall 3 of the V-pulley in the meantime is schematically shown in FIG. 4. In the drawing, the end face 35 and the inner wall 3 are brought into contact with each other at the line of contact A, i.e., an extension of a straight line which passes through the axis 2 of the V-pulley 1 and is perpendicular to the end face 35. Subsequently, when the end face 35 rotates back and forth by $\theta°$ about an axis parallel to the axis of the connecting pin, the line of contact A then moves to a line A' and, at the same time, the line of contact newly moves to a line B. The rotation of the end face invariably occurs when the block begins to be engaged with or disengaged from the V-pulley and also occurs at the time of speed change. When seen with respect to the end face 35 side, the above-described movement of the line of contact is movement from the line A' to the line B, a distance therebetween being equal between the upper side and the lower side of the end face 35. On the other hand, when seen with respect to the inner wall 3 side of the V-pulley, the movement of the line of contact is movement from the line A to the line B. In other words, the line of contact moves by $\theta°$ in terms of the angle seen from the axis 2 of the V-pulley, and that distance is longer for the upper side of the end face 35 than the lower side thereof. Accordingly, the movement of the line of contact cannot be effected smoothly, the rotation of the end face 35 by $\theta°$ occurs in a frictional manner. Thus, the movement of the line of contact involving frictional movement takes place, resulting in abrasion, creaks, etc. The posture of the block at the time of engagement shown in FIG. 3A and the posture at the time of disengagement shown in FIG. 3D illustrate an ideal case. Actually, however, it is estimated that the block rotates more irregularly, in which case it becomes difficult for the end face 35 to be easily located within the above-described plane P. Consequently, it becomes impossible for the block to abut against the inner wall 3 of the V-pulley in the internal area of the end face 35, so that the edge of the end face 35 is brought into contact with the inner wall 3 of the V-pulley at an acute angle. This results in a decline in the driving capabilities, noises, partial abrasion, and the like.

Figures 5A, 5B:
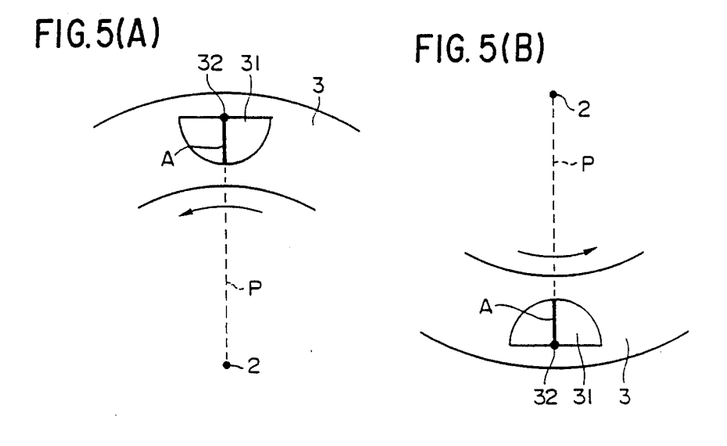
FIGS. 5A and 5B are diagrams illustrating different postures of the block with respect to the V-pulley when the end face of the block is formed into a convex surface in accordance with the present invention.
Figure 6:
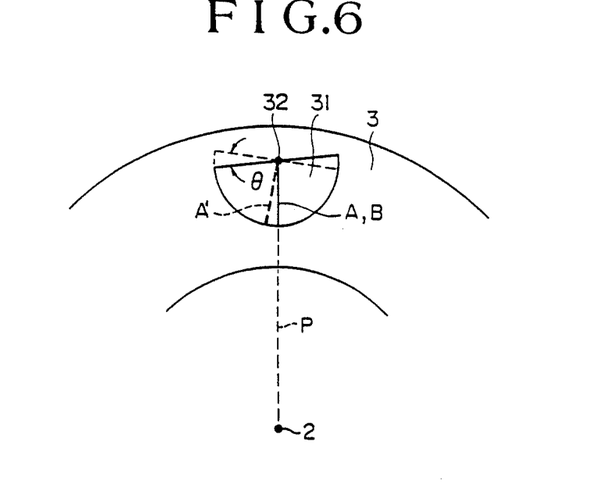
FIG. 6 is a diagram illustrating lines of contact between the end face of the block and the inner wall of the V-pulley when the end face of the block is formed into a convex surface in accordance with the present invention.

On the other hand, however, in the present invention, the end face is not formed into a flat surface but a conically convex surface 31 which has an axis 32 parallel to the axis 21 of the connecting pin 20 and hence parallel to the axis 2 of the V-pulley and has an apex angle substantially identical with that of the inner wall 3 of the V-pulley. If this arrangement is adopted, the inner wall 3 of the V-pulley and the convex surface 31 are brought into contact with each other at the straight line of contact A located within the plane P including the axis 2 of the V-pulley 1 and the axis 32 of the convex surface. Accordingly, the posture of the block at the time of engagement becomes like the one shown in FIG. 5A, while its posture at the time of disengagement becomes like the one shown in FIG. 5B. Hence, the rotation of the block from engagement until disengagement does not occur, with the result that the amount of abrasion can be reduced. Nevertheless, this is an ideal case of engagement and disengagement, and in actual cases it is estimated that the block is engaged and disengaged with postures that are different from those shown in FIGS. 5A and 5B and that the block consequently rotates. In that case, the convex surface 31 and the inner wall 3 of the V-pulley are brought into contact with each other at the straight line of contact A located within the plane P including the axis 2 of the V-pulley and the axis 32 of the convex surface, as schematically shown in FIG. 6. Subsequently, when the convex surface 31 is rotated back and forth by $\theta°$, the line A moves to the line A′, but, at the same time, the line of contact also moves to the line B. That is, the movement of the line of contact, when seen with respect to the the convex surface 31 side, is movement from the line A′ to the line B, while, when seen with respect to the inner wall 3 side of the V-pulley, it is movement from the line A to the line B. Accordingly, the rotation of the convex surface 31 takes place in a frictional manner. However, the amount of movement of the line of contact in conjunction with the rotation is appreciably small, so that the convex surface 31 and the inner wall 3 of the V-pulley can be brought into contact with each other in the form of smooth contact, not in the form of contact at the edge. Hence, this arrangement makes it possible to overcome the problems of the decline in driving capabilities, noises, partial abrasion, etc. In FIG. 6, a case where the convex surface 31 is formed into a semiconical shape is illustrated to facilitate an understanding of the fact that the convex surface 31 is a curved surface cut from a cone. In this case, the block has a smooth linear contact within a range in which the block rotates back and forth 180°. If the block is formed as a cone or a truncated cone, a smooth linear contact is maintained within the range of 360° rotation, i.e., in any manner. However, if the estimated rotation is between the line A, and the line B shown in FIG. 6, it suffices if that portion is formed into a convex surface cut from the cone described above, and the other portions are formed in such a manner as not to abut the inner wall 3.

Each of the link plates 10 is subjected to a force applied by the V-pulley 1 through the convex surface 31 of the block 30 and a force applied by the preceding and following link plates via the connecting pins 5. These forces constitute couple to cause the rotation of the block 30. Accordingly, in order to reduce couple itself which causes the rotation, as for the position of the axis 32 of the cone forming the convex surface 31 regarding the longitudinal direction of the link plate 10, it is preferred that the axis 32 is located in any position within a plane which includes the axis 21 of the connecting pin and is perpendicular to the longitudinal direction of the link plate 10. In this case, two blocks 30 are provided in a juxtaposed manner on the outermost link plate 12 among the main link plates 11. In addition, in this case, as a means of fixing the block 30 with respect to the outermost link plate 12 among the main link plates 11, the block 30 may be fixedly secured to the outermost link plate 12, or may be integrally formed therewith. As an alternative means, the block 30 may be fixedly secured to the connecting pin 20, or formed at the end face of the connecting pin 20, and subsequently the connecting pin 20 may be fixedly secured to the outermost link plate 12.

As the position of the axis 32 of the cone forming the convex surface 31, within the plane which includes the axis 21 of the connecting pin and is perpendicular to the longitudinal direction of the link plate 10, a line of intersection cut by the upper surface of the link plate 10 can be selected. If the axis 32 is disposed at a position higher than the upper surface of the link plate 10, the convex surface 31 becomes similar to a partial truncated cone, and the radius of curvature of the convex surface becomes large, so that the configuration of the convex surface 31 becomes close to that of a flat surface. This is disadvantageous since the risk of resulting in edge-like contact will increase. On the other hand, if the axis 32 is located at a position lower than the upper surface of the link plate 10, the length of the line of contact becomes short, which causes a decline in the driving force-transmitting capabilities, resulting in a similar disadvantage. Accordingly, it is possible to cite as one preferred embodiment of the present invention a case where the axis 32 of the cone forming the convex surface 31 is disposed on a line of intersection between a plane which includes the axis 21 of the connecting pin and is perpendicular to the longitudinal direction of the link plate 10 on the one hand, and the upper surface of the link plate on the other. However, this embodiment may entail some difficulties in actual fabrication of the blocks.

Figure 7:
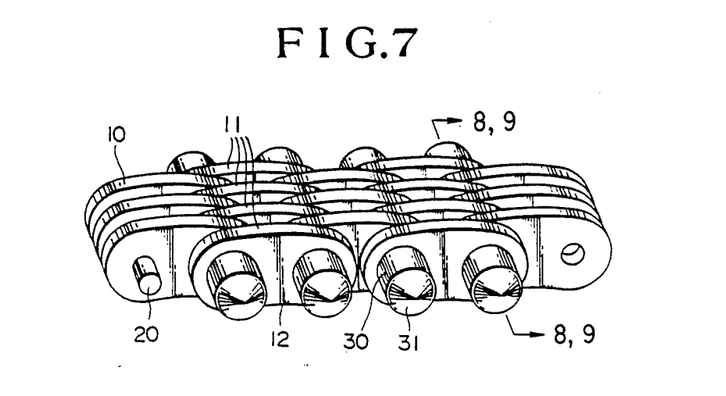
FIG. 7 is a perspective view of a second embodiment and a third embodiment of the present invention.
Figure 8:
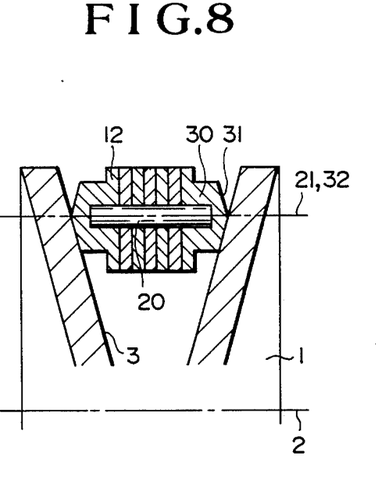
FIG. 8 is a cross-sectional view taken along the line 8,9—8,9 of FIG. 7 relating to the second embodiment of the present invention.

Accordingly, as a second preferred embodiment of the present invention, it is possible to cite a case where the axis 32 of the cone forming the convex surface 31 is brought into alignment with the axis 21 of the connecting pin, as shown in FIGS. 7 and 8. In other words, the block 30 in this embodiment is formed into a configuration virtually combining a cone and a cylinder. Since the block becomes vertically symmetrical, fabrication is facilitated. In this case, although the convex surface 31 can be formed into the configuration of a truncated cone, but it is more advantageous to form it into a conical shape in the light of driving force-transmitting capabilities.

Figure 9:
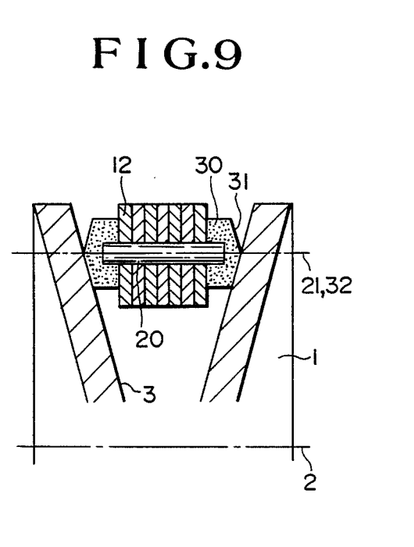
FIG. 9 is a cross-sectional view taken along the line 8,9—8,9 of FIG. 7 relating to the third embodiment of the present invention.

In the foregoing embodiments, although the block 30 is fixed with respect to the outermost link plate 12 among the main link plates 11, the block 30 can be formed rotatably. In other words, the convex surface 31 which is brought into contact with the inner wall 3 of the V-pulley may be formed into the shape of a cone or truncated cone, and the block 30 may be made rotatable about the axis 32 of the cone or the truncated cone. That is, a perspective view of a third embodiment of the present invention appears substantially identical as that of FIG. 7 illustrating the second embodiment, and the blocks can be formed in such a manner that the cross-sectional view taken along the line A-A of FIG. 7 appears like FIG. 9. However, unlike the second embodiment, the third embodiment is arranged such that the connecting pins 20 projecting from the outer surface of the outermost link plate 12 among the main link plates 11 can be rotatable with respect to all the link plates 10, and the blocks 30 are respectively secured to the opposite ends of the connecting pin by being force fit therewith.

If the blocks are fixed with respect to the outer link plate, as described in connection with FIG. 6, when the outer link plate has rotated back and forth, there is the possibility of the blocks undergoing rotational friction with respect to the V-pulley. Since this rotational friction takes place under high pressure, noises are generated, and abrasion can occur to both the blocks and the V-pulley. In contrast, in accordance with the arrangement of the third embodiment, since the blocks are rotatable, the following effect is expected to be produced. In the first place, even if the outer link plates move back and forth, the blocks do not undergo frictional contact with respect to the V-pulley. Accordingly, noises due to friction are not generated, losses of the driving force are virtually nil, and the amount of abrasion is reduced for both the blocks and the V-pulley. Secondly, the line of contact in the block changes in a random manner, the entire surface of the conical surface of the block is brought into the inner wall of the V-pulley, so that this arrangement is very advantageous in suppressing abrasion and a chain having a long life can be obtained. Third, the blocks rotate slightly when they are engaged with or disengaged from the V-pulley, with the result that the engagement and disengagement are made smooth, thereby reducing the noises caused by the collision between the blocks and the V-pulley.

Figure 10:
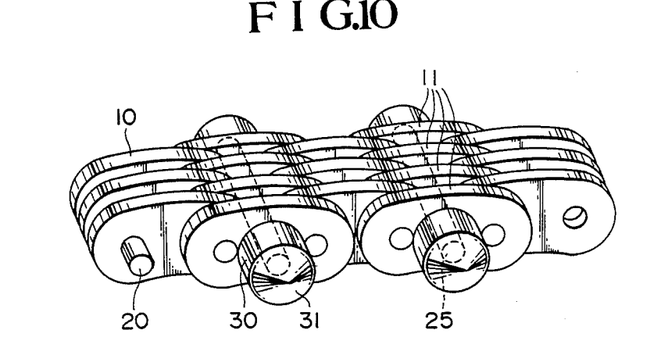
FIG. 10 is a perspective view of a fourth embodiment of the present invention.

Although in the above-described third embodiment the block 30 is adapted to rotate about the axis 21 of the connecting pin 20, an arrangement may be alternatively provided such that, as shown in FIG. 10 illustrating a fourth embodiment, a rotary shaft 25 parallel with the connecting pin is provided separately in the vicinity of the center of the main link plate 11, and the block 30 is provided in such a manner as to rotate about the shaft 25.

Figure 11:
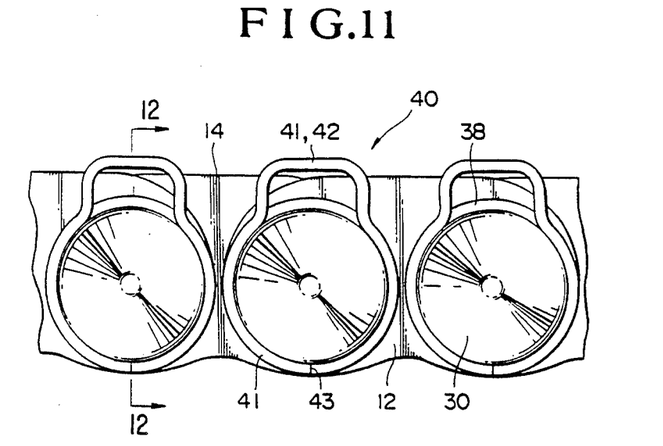
FIG. 11 is a partial side-elevational view of a fifth embodiment of the present invention.
Figure 12:
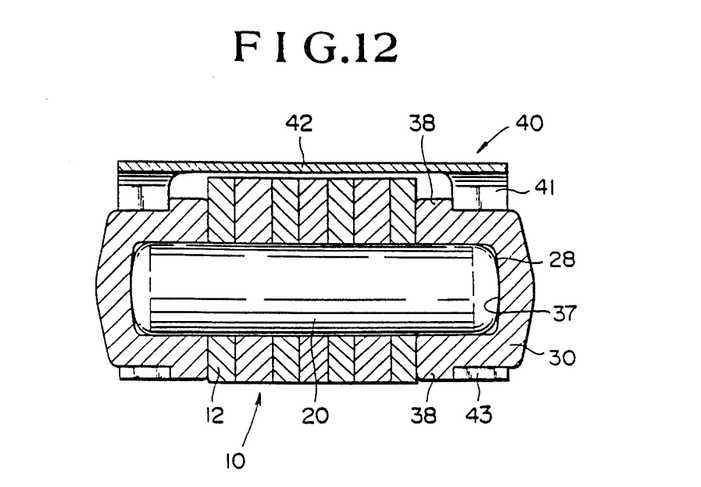
FIG. 12 is a cross sectional view taken along the line 12—12 of FIG. 11.

Although in the above-described third and fourth embodiments the block is fixed with respect to the connecting pin, the block can be made rotatable with respect to the connecting pin, as shown in FIGS. 11 and 12 as a fifth embodiment. In this fifth embodiment, each end of the connecting pin 20 has a convex spherical surface 28, while a receiving portion of the block 30 for fitting therewith has a bottom surface 37 composed of a concave spherical surface having a radius of curvature which is greater than that of the convex spherical surface 28. Thus, the arrangement is such that when the block 30 is fitted with the connecting pin 20, the two members are brought into contact with each other at an area including the axis 32 of the connecting pin, thereby facilitating the rotation of the block 30. In addition, on the side surface of the block 30, a stepped portion 38 projecting from its body is formed, while, on the outside of the stepped portion 38, an annular leg 41 having a cut portion 43 in circumferential direction is fitted with the side surface of the block with a small gap therebetween. The legs 41, 41 respectively fitted on the outer sides of the opposing stepped portions 38, 38 of the block are coupled with each other by means a tabular coupling member 42. Thus, the legs 41, 41 and the coupling member 42 constitute a stopper material 40 for retaining the block. This embodiment is constructed as described above, and since it is unnecessary to forcedly force fit the block with respect to each opposite end of the connecting pin and can be fitted loosely therewith, the block is not subjected to a large compressive stress. Hence, the block is less susceptible to damage and can rotate easily.

It is preferred in terms of the suppression of noises that the chain pitch, i.e., the interval between the adjacent connecting pins, is not formed uniformly regardless of whether the blocks are fixed with respect to the link plate or made rotatable. This is because the resonance of the chain can be reduced. In addition, even if the chain pitch is uniform, if the interval between the adjacent blocks is formed non-uniformly, the frequency of the sound caused by the collision between the blocks and the V-pulley during constant-velocity running does not become uniform, thereby making it possible to reduce the noises.

If the outer width dimension between the two blocks provided on the respective sides of the chain, i.e., the distance between the end face of the block on one side and the end face of the block on the other, is formed to be non-uniform, the radial position of the V-pulley brought into contact with the block varies. Hence, since the frequency of the sound does not become uniform as in the above-described case, it is possible to reduce noises.

Finally, a description will be given of an actual measurement of noises occurring when the blocks where fixedly secured to the opposite ends of the connecting pins, and the connecting pins were made rotatable with respect to the link plates in accordance with the above-described third embodiment. First, various dimensions of the chain will be described. The chain pitch, i.e., the interval between the adjacent connected pins, were set to three kinds of 10.1, 8.6, and 7.7 mm. Generally, the smaller the chain pitch, the more the noises generated by the chain are reduced, but the strength declines, and difficulties in fabrication increase. In the light of strength, the chain pitch of 7.7 mm is considered to be a lower limit as a chain for a continuously variable transmission. The height of the link plates, i.e., the height of the chain was set to 10.4 mm in all cases. Four link plates were used for the main link plates, and their thickness was set to 2.0 mm for the outermost link plate, and 1.8 mm for the others. In addition, three link plates were used for the subsidiary link plates, and their thickness was set to 2.6 mm. Thus, the overall thickness of the main link plates and that of the subsidiary link plates were made as uniform as possible. As for the connecting pins, their diameter was set to 3.8 mm for the chain having a chain pitch of 7.7 mm, and to 4.5 mm for the chain having chain pitches of 8.6 mm and 10.1 mm. The block was formed into a configuration in which a cylinder having a diameter of 7.5 mm and a height of 4.9 mm is combined with a cone. Since the apex angle $\alpha$ of the inner wall of the V-pulley was formed at 158°, the apex angle $\beta$ of the cone of the block was similarly set at 158°. Actually, however, variations on the order of $\pm 2$° occurred with respect to $\beta$, and these blocks were used as they were. Next, a description will be given of the materials of the respective parts of the chain. The link plates were formed of a Cr-Mo steel, the connecting pins were formed of a Ni-Cr-Mo steel or die steel provided with austemper treatment, the blocks were formed of a Cr-Mo steel, and conical portions serving as contact surfaces were provided with surface hardening processing through nitriding. In addition, the V-pulley was formed of a Cr steel whose surface was hardened.

Figure 13:
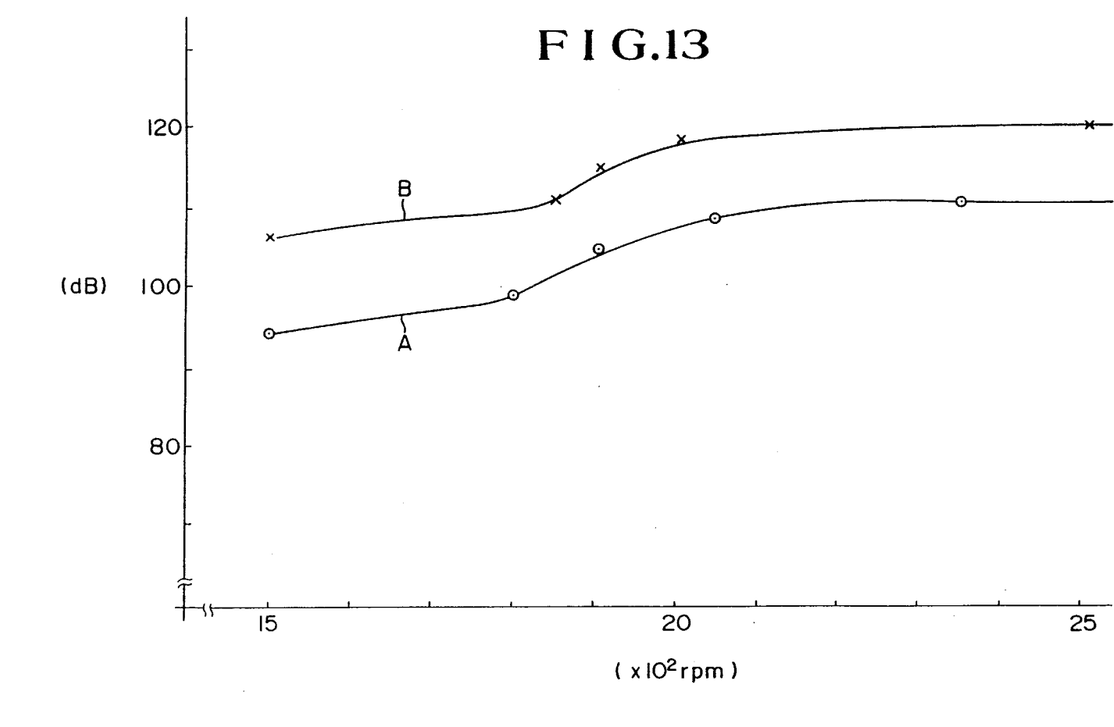
FIG. 13 is a graph in which a comparison is made in the noise level between the chain in accordance with the present invention and a conventional chain.

The above-described chain was mounted on the V-pulley, and the noise level was measured. The measured results are shown in FIG. 13. In the drawing, character A denotes the noise level of the chain having the chain pitch of 7.7 mm in accordance with the present invention, while character B denotes the noise level of the chain disclosed in aforementioned Japanese Pat. Laid-Open No. 219937/1988 by the present inventors, and its chain pitch was also 7.7 mm. This drawing shows that, in the case of the chain in accordance with the present invention, the noise level can be relatively reduced by 10 dB.

In addition, a measurement was also made of a chain having an irregular chain pitch, i.e., in which portions having a chain pitch of 7.7 mm and those having a chain pitch of 8.6 mm were arranged at random, and a comparison of the noise level was made between this chain and the chain having a fixed chain pitch of 7.7 mm. As a result, it was found that the noise level was lower by several dB in the case of the chain having different chain pitches arranged at random. In addition, the sound which was heard by the human ears was softer than the chain having a fixed chain pitch, and was less irritating to the ears. This phenomenon is conceivably attributable to a decline in the resonance.

Furthermore, after a rotation test corresponding to 10,000 km running was conducted, the chain was removed from the V-pulley, and the blocks were visually inspected. As a result, the entire conical surface of each block, i.e., the surface of contact with the V-pulley, displayed gloss. This shows that the entire conical surface of the block was in contact with the V-pulley at random since the block rotates appropriately, and this fact is very advantageous in suppressing abrasion.

Although the embodiments of the present invention have been described above, various modifications are possible without departing from the spirit of the invention which is defined solely in the appended claim.

What is claimed is:

1. A chain for a V-pulley having a plurality of link plates and a plurality of connecting pins connecting adjacent ones of said link plates in such a manner as to be bendable and used by being endlessly trained between a pair of V-pulleys, said chain comprising:

a plurality of blocks each provided on the outside of each of a plurality of outer link plates opposed to an inner wall of said V-pulley;

each of said blocks having a convey surface which is brought into contact with said inner wall of said V-pulley;

said convex surface being formed into the configuration of a cone or a truncated cone which has an apex angle substantially identical to that of said inner wall of said V-pulley and has an axis parallel to an axis of said connecting pin;

means for providing each of said blocks to be easily rotatable about the axis of said cone or said truncated cone.

2. A chain according to claim 1, wherein the axis of said cone of said truncated cone is aligned with the axis of said connecting pin, each of said blocks being fixedly secured to said connecting pin, and said connecting pin being rotatable with respect to link plate.

3. A chain according to claim 1, wherein said block is fixedly secured to a rotary shaft which rotatably penetrates a central portion of a main link plate.

4. The chain according to claim 1, wherein the axis of said cone or said truncated cone is in alignment with the axis of said connecting pin, said block being rotatable with respect to said connecting pin, and opposing ones of said blocks being retained by a stopper member comprising a pair of legs and a coupling member coupling the same.

5. The chain according to claim 1, wherein the spacing between adjacent ones of said connecting pins is substantially non-uniform such that a time interval from the time when one of said blocks is brought into contact with said V-pulley until an ensuing one of said blocks is brought into contact with said V-pulley during constant-velocity running of said chain is substantially non-uniform.

6. The chain according to claim 1, wherein the traverse distances between the convex surfaces of opposing ones of said blocks are substantially non-uniform for longitudinally adjacent sets of connecting pins and associated blocks such that a radius on said V-pulley where said blocks are brought into contact therewith during constant-velocity running of said chain is substantially non-uniform.

7. The chain according to claim 1 wherein the axis of said cone or said truncated cone is in alignment with the axis of said connecting pin, and wherein the ends of said connecting pins contact respective ones of said blocks and have contact surface radii of curvature less than that of the contacting surface of said blocks.

* * * * *

UNITED STATES PATENT AND TRADEMARK OFFICE
CERTIFICATE OF CORRECTION

PATENT NO. : 4,944,715
DATED : July 31, 1990
INVENTOR(S) : SEITARO UEDA, et al.

It is certified that error appears in the above-identified patent and that said Letters Patent is hereby corrected as shown below:

Claim 1, column 11, line 33: "convey" should be -- convex --

Claim 2, column 12, line 5: "of" should be -- or --.

Signed and Sealed this

Tenth Day of September, 1991

Attest:

HARRY F. MANBECK, JR.

Attesting Officer

Commissioner of Patents and Trademarks